United States Patent [19]
van Veenen

[11] Patent Number: 6,164,508
[45] Date of Patent: Dec. 26, 2000

[54] VEHICLE RACK SYSTEMS AND METHODS

[75] Inventor: Erik van Veenen, Leek, Netherlands

[73] Assignee: Heininger & Moore Holdings LLC, Bellingham, Wash.

[21] Appl. No.: 09/120,387

[22] Filed: Jul. 21, 1998

[51] Int. Cl.[7] .................................................. B60R 9/00
[52] U.S. Cl. .................... 224/509; 224/502; 224/523; 224/529; 224/530; 224/531; 224/532
[58] Field of Search ...................... 224/509, 496, 224/503, 504, 508, 511, 518, 519, 520, 523, 529, 530, 531, 532, 924

[56] References Cited

U.S. PATENT DOCUMENTS

| | | | |
|---|---|---|---|
| 4,140,255 | 2/1979 | Weiler | 224/42.21 |
| 5,094,373 | 3/1992 | Lovci | 224/509 |
| 5,114,120 | 5/1992 | Bartelt et al. | 254/323 |
| 5,181,822 | 1/1993 | Allsop et al. | |
| 5,454,496 | 10/1995 | Sumida et al. | 224/509 |
| 5,518,159 | 5/1996 | DeGuevara | 224/488 |
| 5,664,717 | 9/1997 | Joder | 224/502 |
| 5,692,659 | 12/1997 | Reeves | |
| 5,845,832 | 12/1998 | Eichmann | 224/509 |
| 5,884,826 | 3/1999 | Shaver | 224/509 |

*Primary Examiner*—Gregory M. Vidovich
*Assistant Examiner*—Maerena W. Brevard
*Attorney, Agent, or Firm*—Michael R. Schacht; Hughes & Schacht, P.S.

[57] ABSTRACT

A rack system for vehicles that comprises a rack assembly and an attachment assembly comprising a base member mounted to a vehicle hitch receiver, an inner swing arm having a first end pivotably mounted to the base member, an outer swing arm having a first end pivotably mounted to a second end of the inner swing arm, a rack member pivotably mounted to a second end of the outer swing arm, and locking means for selectively locking the base and rack members together to secure the system in a storage position. The rack assembly is rigidly attached to the rack member. When the base and rack members are locked together, the rack assembly is securely located immediately above and behind the vehicle hitch receiver. When the rack member is unlocked from the base member, the rack assembly may be moved within a movement area defined by the rear of the vehicle and a horizontal, generally circular arc that extends from one side of the vehicle to the other side of the vehicle.

20 Claims, 14 Drawing Sheets

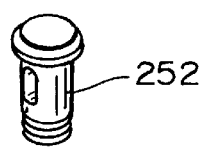
FIG. 8
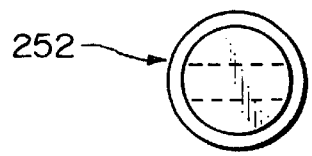
FIG. 9E
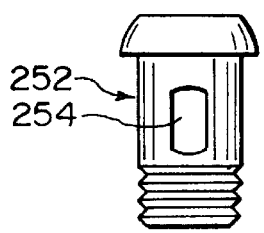
FIG. 9B
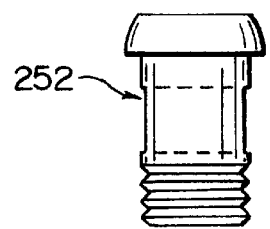
FIG. 9C
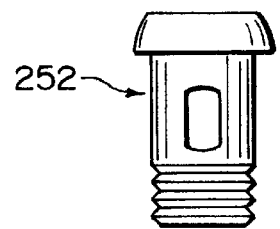
FIG. 9D
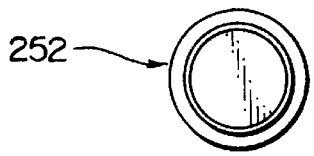
FIG. 9A
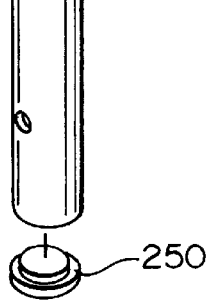
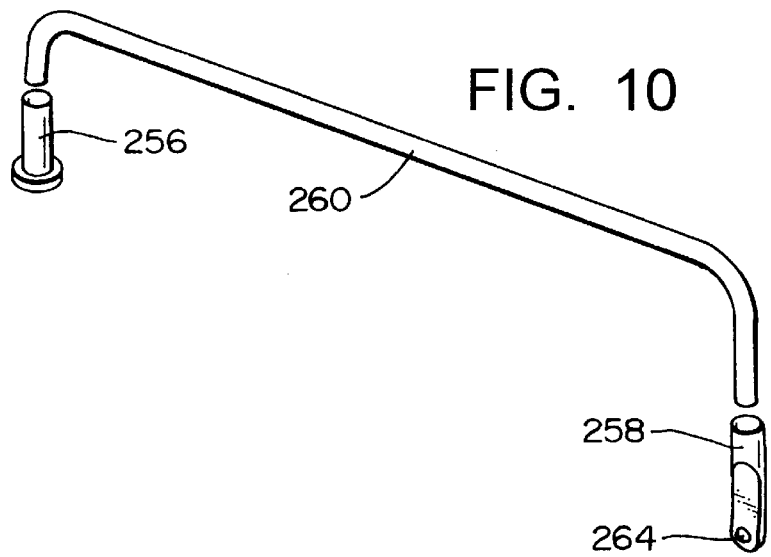
FIG. 10

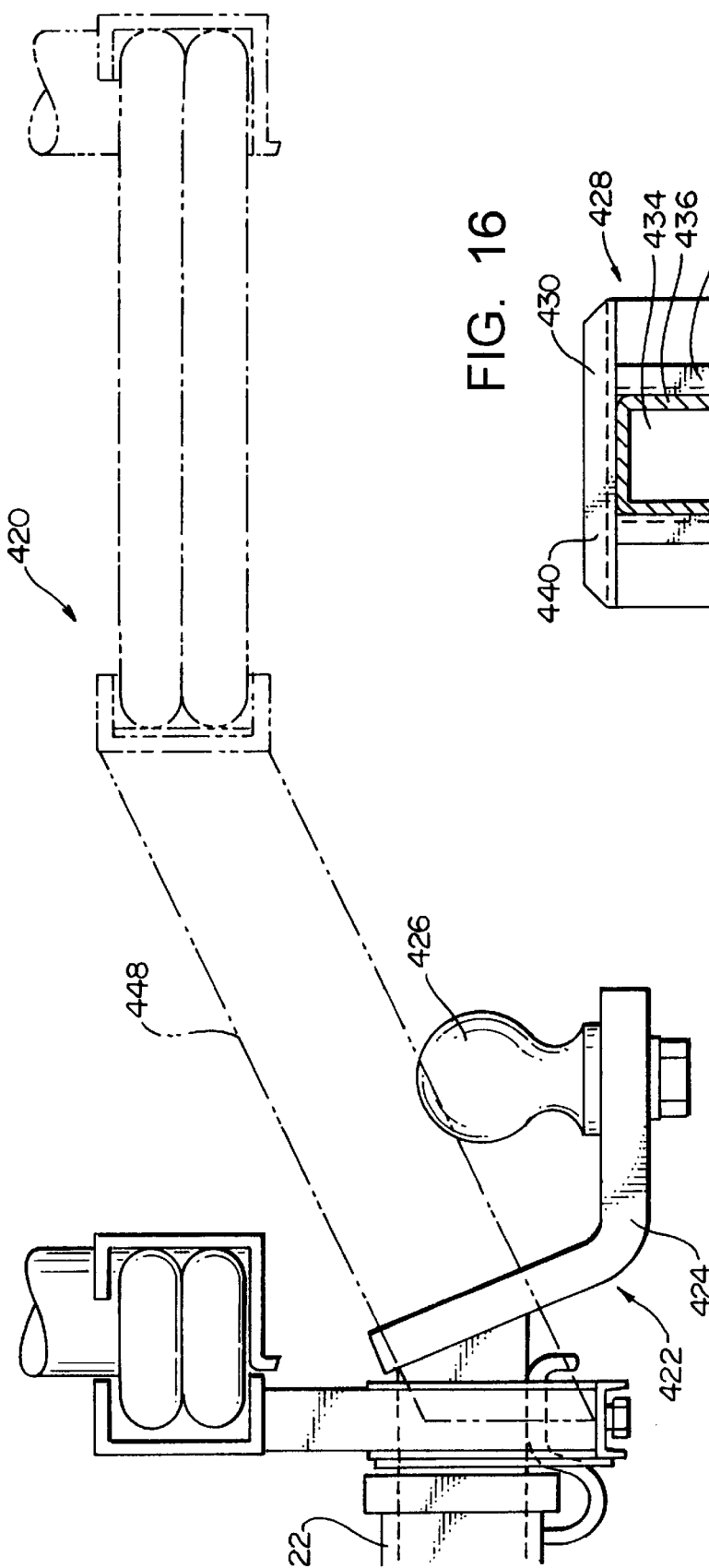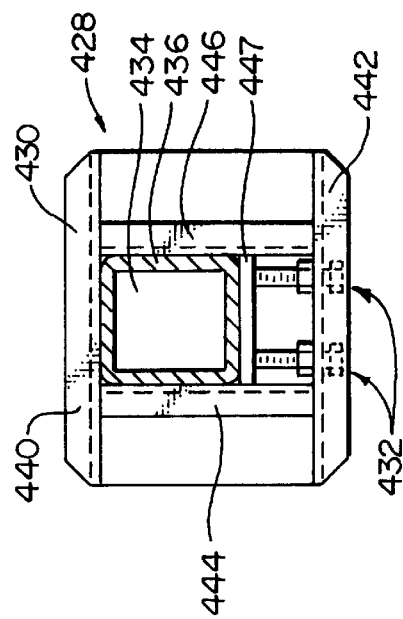

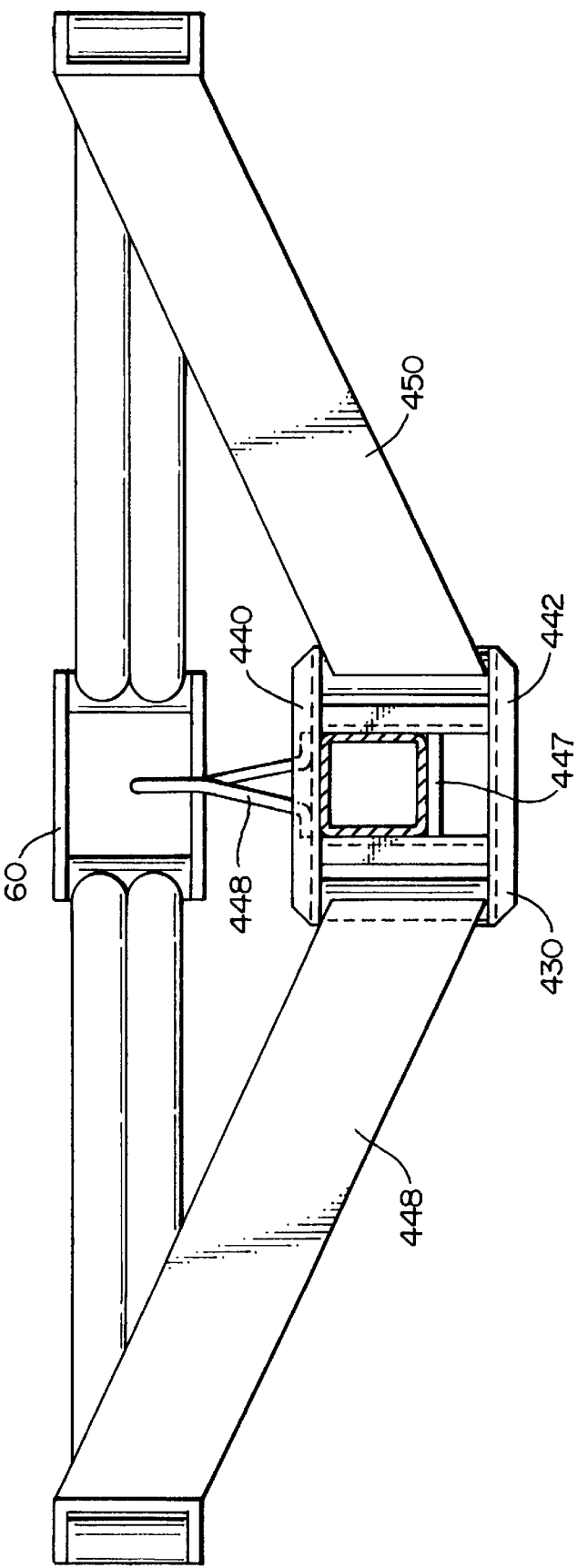

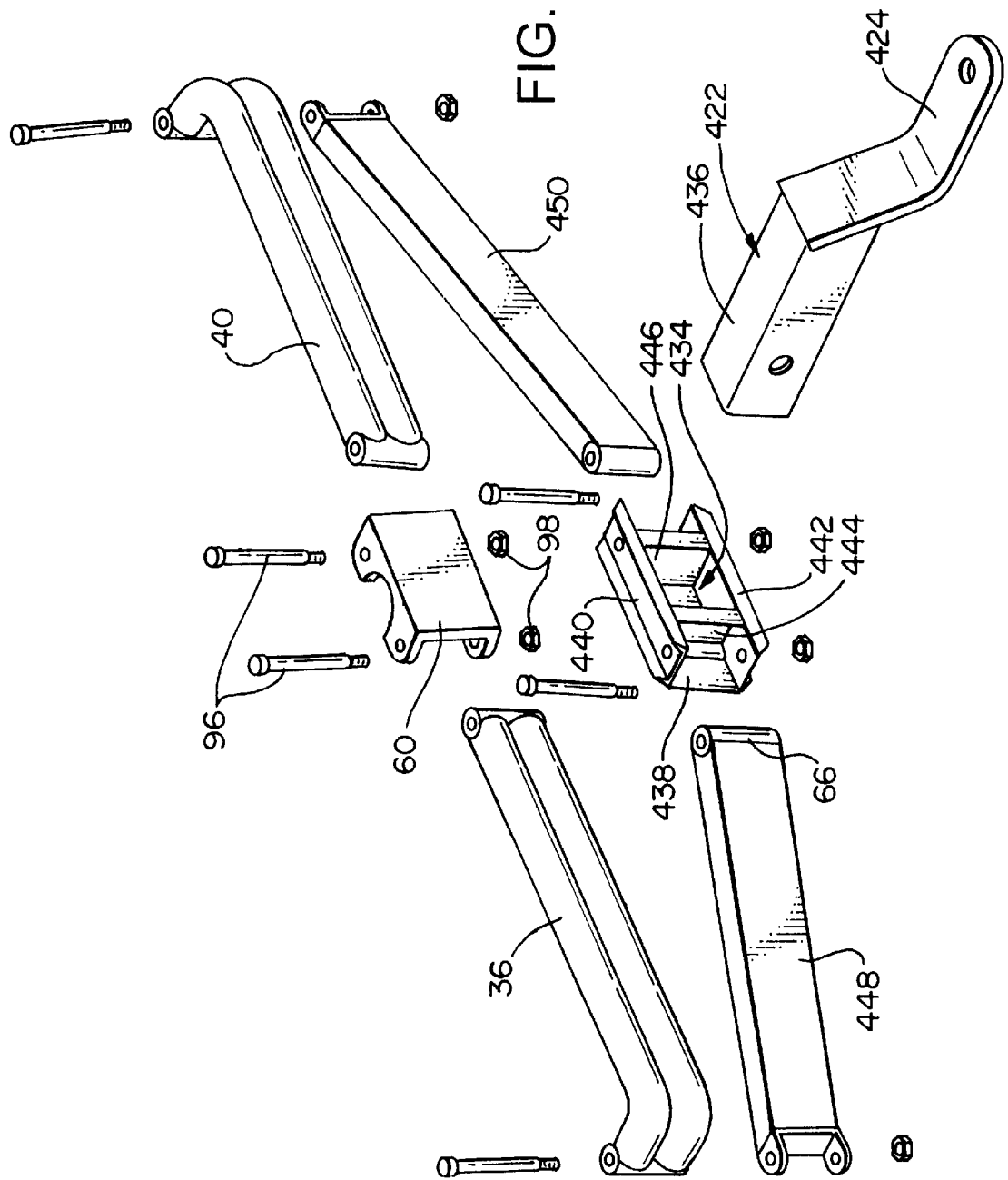

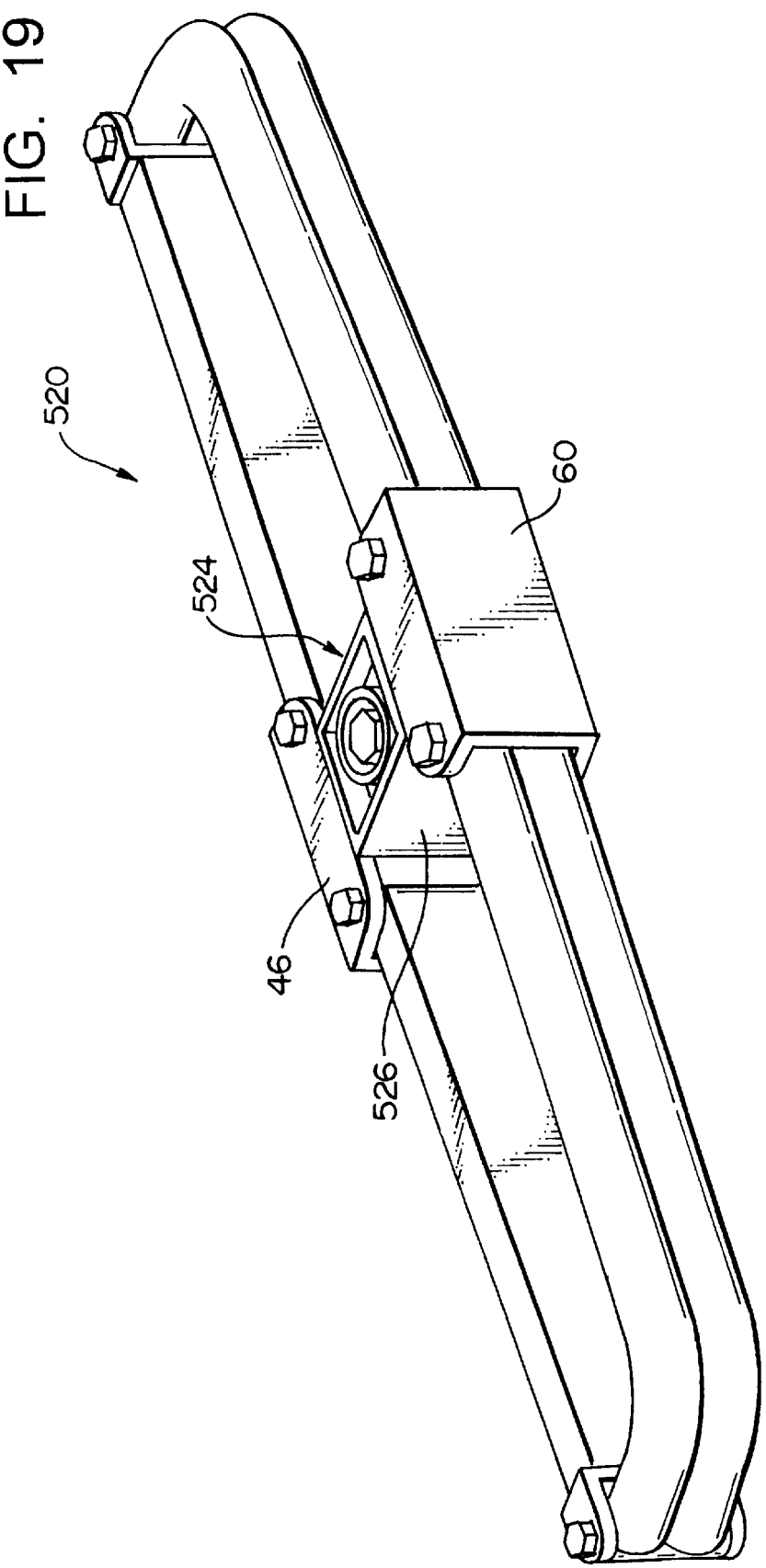

VEHICLE RACK SYSTEMS AND METHODS

TECHNICAL FIELD

The present invention relates to carrying systems and, in particular, to carrying systems that are adapted to be supported by a trailer hitch or a hitch receiver mounted onto a vehicle.

BACKGROUND OF THE INVENTION

Vehicle owners often wish to transport items that cannot fit into the interior of the vehicle either because the item to be transported is too large for the vehicle interior or the vehicle interior is already filled with occupants or other items.

For these situations, a variety of external racks are available in the marketplace. These external racks are attached to the exterior of the vehicle using one of a number of attachment systems and allow items such as bicycles, skis, camping equipment, luggage, barbecue grills, gas generators, and the like to be carried on the outside of the vehicle. Such external racks are sold by automobile manufacturers as original equipment and by third parties as after-market add-on products.

The present invention relates to a class of external vehicle racks using what will be referred to as a hitch-type attachment system. External racks using a hitch-type attachment system are rigidly connected to a trailer hitch receiver rigidly mounted to the rear of the vehicle. Trailer hitch receivers are conventional and will not be described herein in detail.

But it is relevant to note that these hitch receivers are designed to allow the vehicle to tow trailers, such as camping trailers, boat trailers, utility trailers, and the like, having relatively large tongue weights. Hitch receivers thus are generally capable of bearing substantial static and dynamic downward loads. In addition, trailer hitches are sold and installed according to a standardized system that ensures that a given trailer hitch will meet minimum tongue load requirements. Racks employing hitch-type attachment systems thus are capable of carrying relatively bulky items safely and reliably.

Many vehicles have trunks or rear doors that allow easier access to the rear of the vehicle interior. Typically, sedans have a trunk, while minivans, sport utility vehicles, trucks, and/or station wagons all have some type of rear door. These rear doors may be classified as wagon doors (rotate down about a horizontal axis), barn doors (rotate out about a vertical axis), or lift doors (rotate up about a horizontal axis). With most racks employing hitch-type attachment systems, the rack extends upward at the rear of the vehicle and can interfere with the operation of any one of these types of rear doors. For simplicity, both trunks and rear doors will be collectively described as rear doors in the following discussion.

In many cases, the rack and/or items carried thereby must be removed from the vehicle hitch receiver before the rear door can be used. The removal of the rack from the hitch receiver and/or items from the rack can be a relatively inconvenient, time-consuming process. In addition, the rack must be replaced before it can be used again.

RELATED ART

The Applicant is aware of a number of attempts to design vehicle racks using hitch-type attachment systems that reduce interference with the operation of a vehicle rear door.

U.S. Pat. No. 5,664,717 to Joder discloses a vehicle rack system employing a hitch-type attachment system that allows the rack to be swung out of the way of the rear of the vehicle. An inner end of a rigid member is rigidly attached to the hitch receiver (located at the centerline of the vehicle) such that an outer end of the rigid member extends towards the side of the vehicle. A swing member is pivotably attached to the outer end of the rigid member such that a distal end of the swing member may move along a horizontal, circular arc.

The swing member thus swings between a storage position (distal end at the centerline of the vehicle) and an access position (distal end outboard of the side of the vehicle). The rack is attached to the distal end of the swing member and thus moves to the side of the vehicle when the swing member is rotated from the centerline position to the side position. The rack system does not interfere with the vehicle rear door when the swing member is in the side position.

The attachment system disclosed in the Joder patent is relatively large and heavy. The rigid member and swing member must be of sufficient size to extend from the centerline towards the side of the vehicle and still handle the dynamic loads encountered when the vehicle is moving. The size and weight of the attachment system of the Joder patent may reduce the load capacity of the rack and will make storage and installation of the rack system inconvenient and time-consuming. The Joder system also allows a limited range of movement in that the rack moves only to one side of the vehicle.

Another external rack system is disclosed in U.S. Pat. No. 5,181,822 to Allsop et al. The Allsop patent discloses an attachment system that allows the rack to be moved between a storage position and an access position. When the rack is in the storage position, the rack system is closely adjacent to the vehicle rear door and will interfere with the operation of the rear door. When the rack is in the access position, the rack is located downward and to the rear of the vehicle rear door. In some situations, the rack system will not interfere with operation of the rear door.

The attachment system employed by the Allsop device employs a base mounted to the hitch receiver, two parallel frame members the lower ends of which are pivotably attached to the base member, and a rack member pivotably attached to the upper ends of the frame members. The rack is mounted on the rack member. When in the storage position, the frame members are locked together so that they cannot move relative to the base member. When unlocked, the frame members rotate such that their upper ends move in a vertical, circular arc. The rack member connects the frame member upper ends so that the rotation of the frame members is limited.

The range of movement allowed by the attachment system of the Allsop device is somewhat limited and thus this device can, in some situations, still interfere with the operation of the vehicle rear door. In addition, the rack swings upward when it is moved from the access position to the storage position. The operator must thus manually lift the rack, rack member, frame members, and any items carried by the rack when moving the rack from the access position to the storage position. This lifting of the entire assembly creates undesired exertion on the operator. And because the rack moves straight back into the access position, with bicycles or the like loaded on the rack the operator must stand to one side or the other of the rear of the vehicle to access the rear door. Standing to one side of the vehicle may not be possible or appropriate in certain circumstances.

U.S. Pat. No. 5,692,659 to Reeves discloses a bicycle rack system in which the rack assembly is pivotably connected to a base member attached to the vehicle. The rack assembly is simply pivoted from a storage position down and away from the rear of the vehicle into an access position. The system described in the Reeves patent requires the operator to lift the entire rack assembly and anything carried thereby up out of the access position. The operator must stand to the side of the vehicle when moving the rack into the access position. And the items carried by the rack are tipped to the side when the rack is in the access position, which is undesirable and can damage certain types of items.

The need thus exists for external, hitch-receiver mounted storage racks for vehicles that are small, lightweight, easy to install and use, inexpensive, allow a large range of movement, do not interfere with most vehicle rear doors, and do not require undue exertion by the operator.

OBJECTS OF THE INVENTION

From the foregoing, it should be clear that one primary object of the present invention is to provide improved vehicle rack systems and methods.

Another more specific object of the present invention is to obtain improved vehicle rack systems and methods that obtain a favorable mix of the following characteristics:

- allows access to the rear of a vehicle through a vehicle rear door;
- does not require the operator to lift a rack assembly and items carried thereby when accessing the rear of the vehicle;
- does not require the operator to stand to one side of the vehicle when accessing the rear of the vehicle;
- is relatively small, simple to use, and lightweight for easy and quick installation and removal from the vehicle and storage between uses;
- allow the rack to be modified to carry an one of a number of items; and
- can be manufactured and sold relatively inexpensively.

SUMMARY OF THE INVENTION

These and other objects are obtained by the present invention, which is a rack system for vehicles that comprises a rack assembly and an attachment assembly comprising a base member mounted to a vehicle hitch receiver, an inner swing arm having a first end pivotably mounted to the base member, an outer swing arm having a first end pivotably mounted to a second end of the inner swing arm, a rack member pivotably mounted to a second end of the outer swing arm, and locking means for selectively locking the base and rack members together to secure the system in a storage position. The rack assembly is rigidly attached to the rack member.

When the base and rack members are locked together, the rack assembly is securely located immediately above and behind the vehicle hitch receiver. When the rack member is unlocked from the base member, the rack assembly may be moved within a movement area defined by the rear of the vehicle and a horizontal, generally circular arc that extends from one side of the vehicle to the other side of the vehicle.

When the rack system is in its unlocked state, the operator may move the rack assembly anywhere within the movement area to allow access to the rear door of the vehicle and, as necessary, to avoid any obstacles to the rear of the vehicle. In addition, the rack system of the present invention may be made relatively small and lightweight, is easy to install and use, and requires no lifting by the operator during use. And when in its locked state, the rack system is relatively compact.

In its preferred form, the rack system of the present invention comprises first and second pairs of inner and outer swing arms. These pairs of swing arms are located on either side of the hitch receiver. When the rack system is in its unlocked state, the inner swing arms are aligned with each other, the outer swing arms are aligned with each other, and all of the swing arms are generally parallel to each other. The pairs of inner and outer swing arms will force the rack member to align with the base member when the rack system is in its storage configuration. This arrangement of pairs of inner and outer swing arms also allows the rack system to be made strong, stable, and lightweight and does not significantly limit the size of the movement area.

The locking system may be embodied as a spring loaded plate attached to one of the base and rack members. The spring biases the plate into a locking position, but the plate may be moved out of the locking position against the spring by the application of deliberate manual pressure. The plate is perforated or notched, and the perforation or notch is sized, dimensioned, and located to receive a projection extending from the other of the base and rack members. The plate is also shaped to engage the projection and deflect out of the locked position as the rack assembly is moved into its storage position. Then, when the rack assembly enters the storage position such that the rack system is in its storage configuration, the projection aligns with the perforation or notch so that the plate may return to its locked position.

In another form, the inner swing arms may be upwardly canted so that they may extend over a trailer hitch ball attached to the vehicle hitch receiver. In this case, the base member will be attached to a trailer hitch member on which the ball is mounted rather than directly to hitch receiver.

In yet another form the present invention may comprise means for mounting the base member directly to a trailer hitch ball mounted attached to the vehicle hitch receiver.

BRIEF DESCRIPTION OF THE DRAWINGS

FIG. 8 is an exploded view of a support tube employed by the rack system of FIG. 1;

FIGS. 9a–9e are top plan, first side elevational, second side elevational, third side elevational, and bottom plan views of an end cap that may be applied to the support tube assembly shown in FIG. 8;

FIG. 10 is an exploded view of a lock cable that may be used by the system of FIG. 1;

FIG. 15 is a side elevational view of a second embodiment of a rack system constructed in accordance with, and embodying, the principles of the present invention;

FIG. 16 is a section view showing how the rack assembly of FIG. 15 engages a trailer hitch assembly;

FIG. 17 illustrates that the locking systems described with reference to the first embodiment must be modified to work with this second embodiment;

FIG. 18 is an exploded view of the rack system of FIG. 15;

FIG. 19 is a perspective view showing a third exemplary embodiment of a rack system constructed in accordance with, and embodying, the principles of the present invention;

DETAILED DESCRIPTION OF THE PREFERRED EMBODIMENTS

Figure 1:
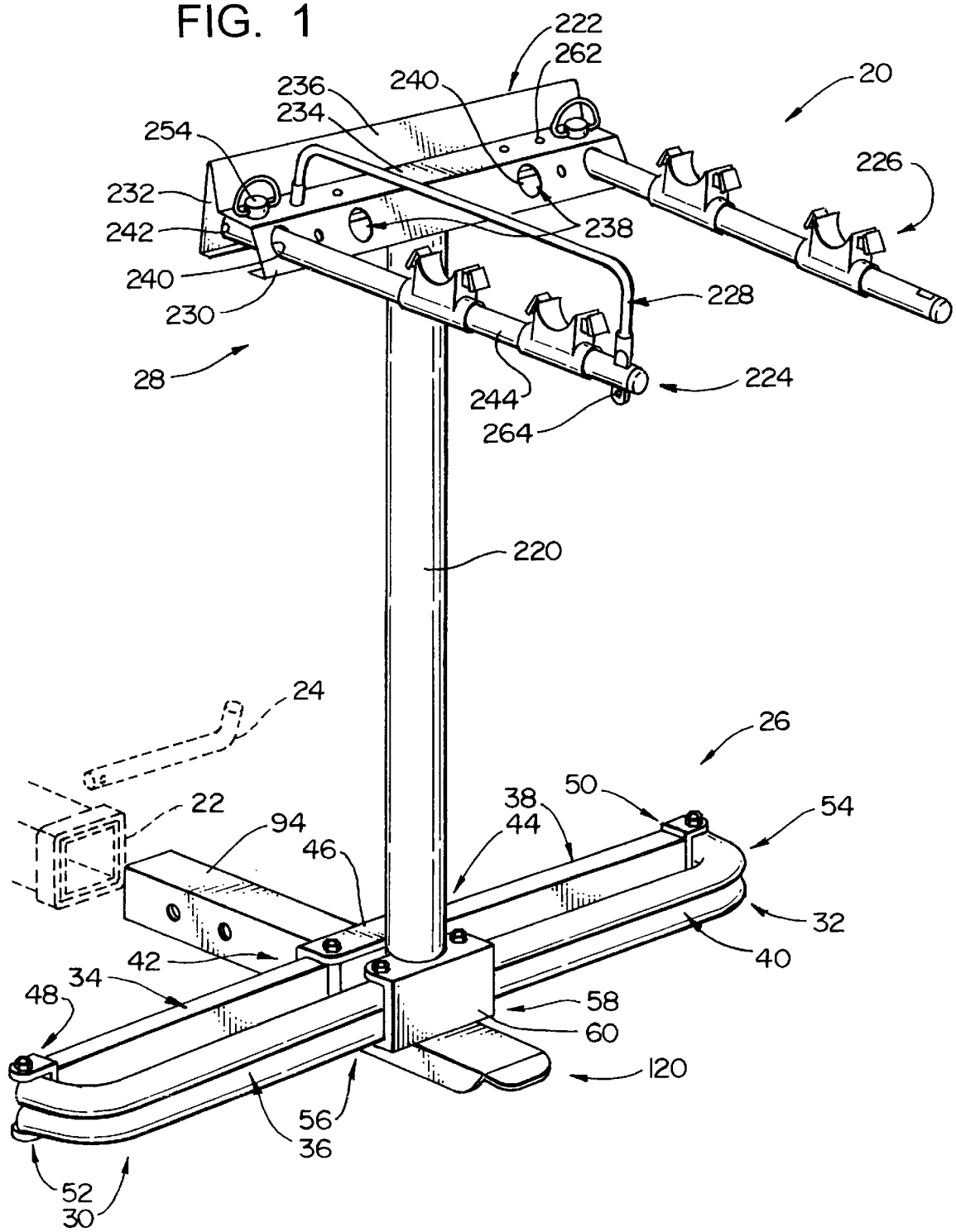
FIG. 1 is a perspective view of a first embodiment of a rack system constructed in accordance with, and embodying, the principles of the present invention.

Referring initially to FIG. 1 of the drawing, depicted at 20 therein is a rack system constructed in accordance with, and embodying, the principles of the present invention. The rack system 20 is adapted to be attached to a trailer hitch receiver 22 by a hitch pin 24. The hitch receiver 22 is conventional, is rigidly attached to a rear of a vehicle, and will be described herein only to the extent necessary for a complete understanding of the present invention.

The rack system 20 comprises an attachment system 26 and a rack assembly 28. The attachment system 26 attaches the rack assembly 28 to the hitch receiver 22 such that the rack system 20 may be reconfigured between a storage configuration in which the rack assembly 28 is locked into its storage position as shown in FIG. 1 and an access configuration in which the rack assembly 28 is not locked into the storage position. When the rack system is in its access configuration, the rack assembly 28 may be moved within a two-dimensional movement area.

With the foregoing general understanding of the operation of the system 20, the construction and operation of the attachment system 26 will now be described in further detail. The attachment system 26 comprises a first and second swing arm pairs 30 and 32. The first swing arm pair 30 comprises a first inner swing arm 34 and a first outer swing arm 36, while the second swing arm pair 32 comprises a second inner swing arm 38 and a second outer swing arm 40.

First ends 42 and 44 of the inner swing arms 34 and 38 are pivotably connected to a base member 46, while second ends 48 and 50 of these inner swing arms 34 and 38 are pivotably connected to first ends 52 and 54 of the outer swing arms 36 and 40. Second ends 56 and 58 of the outer swing arms 36 and 40 are pivotably connected to a rack member 60.

Figure 2:
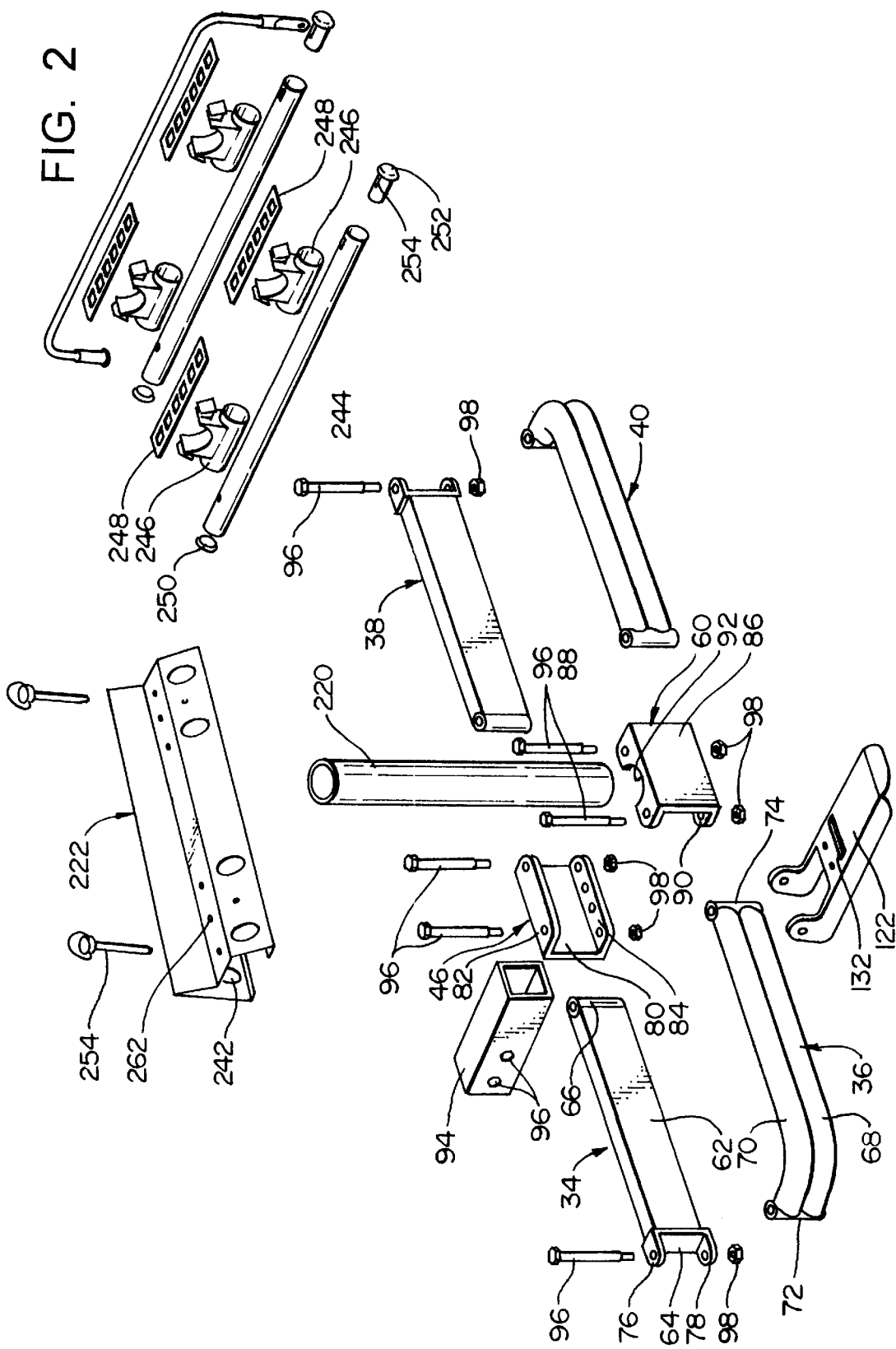
FIG. 2 is an exploded view depicting the rack system of FIG. 1.

As perhaps best shown in FIG. 2, the inner swing arms 34 and 38 are made of hollow metal members 62 having U-shaped brackets 64 attached to one end and hollow cylindrical sleeves 66 attached to the other end. The exemplary outer swing arms 36 and 40 each comprise a pair of hollow metal tubes 68 and 70 welded together into a single unit and hollow cylindrical sleeves 72 and 74 attached to each end of the tubes 68 and 70. The tubes 68 and 70 are bent at approximately a right angle near the sleeves 72, although the exact shape of the tubes 68 and 70 is not critical. The brackets 64 comprise upper and lower projections 76 and 78.

FIG. 2 also shows that the base member 46 is a rigid plate bent to form an inner wall 80 and upper and lower flanges 82 and 84. The rack member 60 is a similar plate bent to form an outer wall 86 and upper and lower flanges 88 and 90. A semi-circular notch 92 is formed in the upper flange 88.

The sleeves 66, 72, and 74 are, in the exemplary system 20, the same length. The distances between the bracket projections 76 and 78, between the base member flanges 82 and 84, and between the rack member flanges 88 and 90 is slightly longer than the length of the sleeves 66, 72, and 74.

The attachment system 26 further comprises a mounting member 92. The mounting member 94 is a hollow length of rigid metal tubing having a rectangular cross-section adapted to be snugly received within the hitch receiver 22. The mounting member 94 is rigidly attached to the inner wall 80 of the base member 46. Holes 96 are formed in the mounting member 94 to receive the hitch pin 24 and form a secure connection between the mounting member 94 and the hitch receiver 22.

The various components described above are welded or bolted together to form the attachment system 26. In particular, the connections of the metal members 62 to the brackets 64 and sleeves 60, of the tubes 68 and 70 to each other and to the sleeves 72 and 74, and of the mounting member 94 to the inner wall 80 of the base member 46 are all formed by welding.

Bolts 96 and nuts 98 are used to form the pivot connections whenever such connections are uses. In particular, the pivot connections between the inner swing arms 34 and 38 to the base member 46 are formed by passing the bolts 96 through holes in the base member upper flange 82, the sleeves 66, and holes in the base member lower flange 84. The pivot connections between the inner swing arms 34 and 38 and outer swing arms 36 and 40 are formed by bolts 96 that extend through holes in the bracket upper projections 76, sleeves 72, and bracket lower projections 78. And the pivot connections between the outer swing arms 36 and 40 and the rack member 60 are formed by bolts 96 extending through holes in the rack member upper flange 88, sleeves 74, and holes in the rack member lower flange 90.

Note should be taken that, in the exemplary system 20, all of these bolts 96 are substantially vertically aligned during use, so the pivot connections formed thereby allow rotation of the members connected thereby in a horizontal plane.

Figure 3:
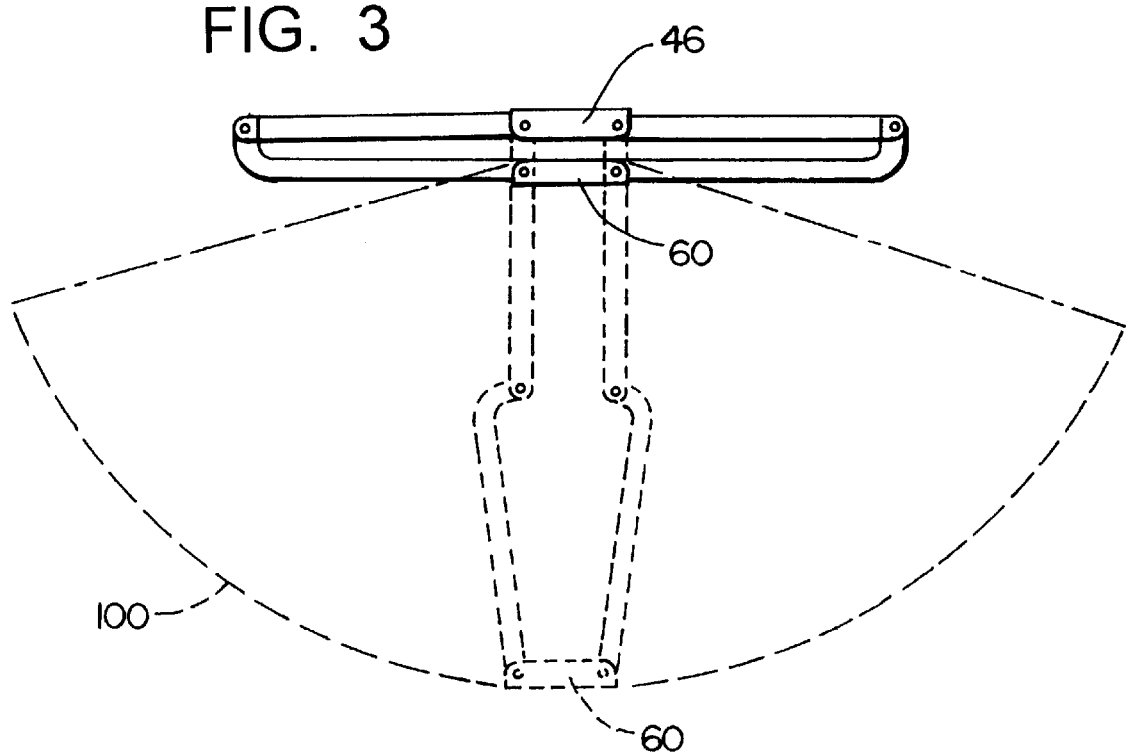
FIG. 3 is a top plan view depicting certain components of the rack system of FIG. 1 and illustrating the range of movement allowed by this rack system.
Figure 4:
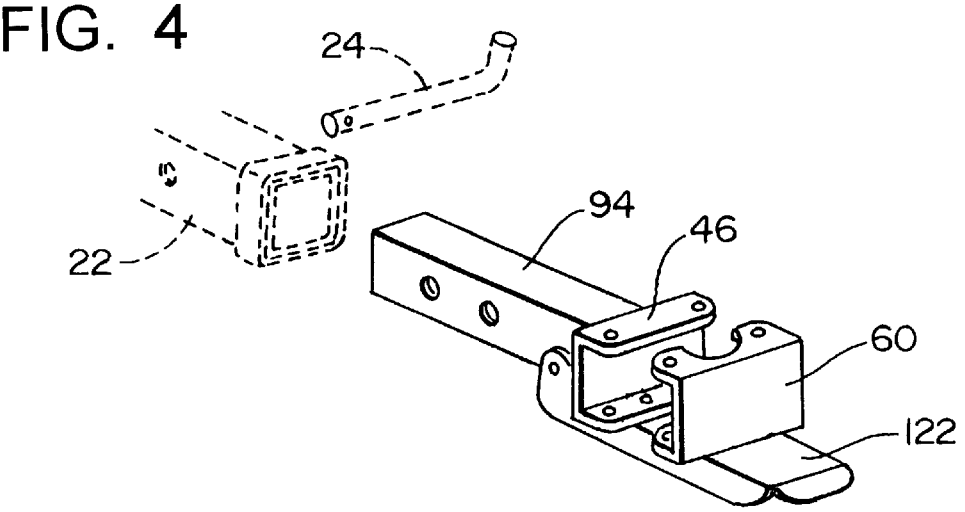
FIG. 4 is a perspective view illustrating how certain components of the rack system of FIG. 1 are assembled and attached to a hitch receiver.

Referring now to FIG. 3, that figure is a somewhat simplified top plan view of the rack system 20 depicting the range of movement of the rack assembly 28 allowed by the attachment system 26. FIG. 3 shows in solid lines the location of the rack member 60 relative to the base member 46 when the rack assembly 28 is in the storage position (i.e., the rack system 20 is in its storage configuration). The location of the rack member 60 at its most distal point from the base member 46 is shown in FIG. 3 by even broken lines. FIG. 3 also roughly depicts the boundaries of the movement area in which the rack member can be moved by uneven broken lines identified by reference character 100. This movement area is generally planar and horizontal in the exemplary system 20.

Referring for a moment back to FIGS. 1 and 2, it can be seen that the attachment system 26 further comprises a locking system 120. The locking system 120 is shown in more detail in FIGS. 4–7. The locking system 120 comprises a lock plate 122, a lock pin 124, a lock projection 126, a lock spring 128, and a lock retaining assembly 130.

The lock plate 122 is pivotably connected to the mounting member 94 (and thus to the base member 48) by the lock pin 124. The retaining assembly 130 retains the lock spring 128 under the lock plate 122 such that the lock spring 128 opposes downward rotation of the lock plate 122 relative to the base member 48. The lock projection 126 is formed on and downwardly extends from the rack member bottom flange 90. A lock slot 132 (FIG. 1) sized and dimensioned to receive the lock projection 126 is formed in the lock plate 122.

When the rack assembly 28 is in the storage position, the rack member 60 is located adjacent to the base member 46, and the lock spring 128 urges the lock plate 122 towards the rack member 60 such that the lock projection 126 is received within the lock slot 132. With the lock projection 126 so received within the lock slot 132, relative movement of the rack member 60 relative to the base member 46 is prevented and the rack system 20 is in its storage configuration.

Figure 5:
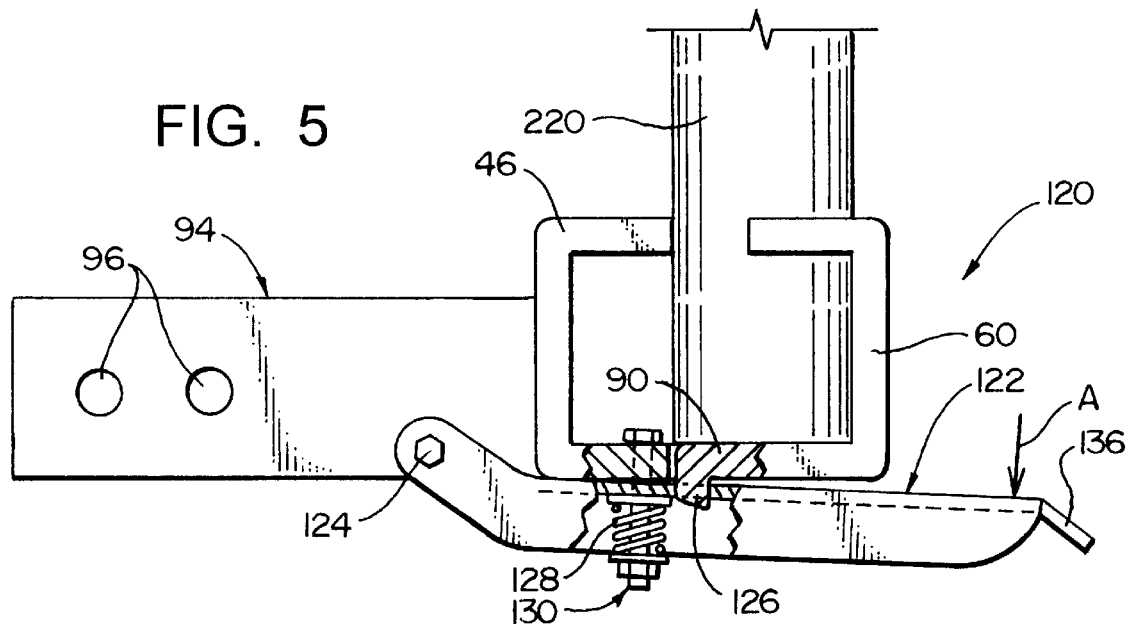
FIG. 5 is a partial cut-away view showing a locking assembly of the rack system of FIG. 1.
Figure 6:
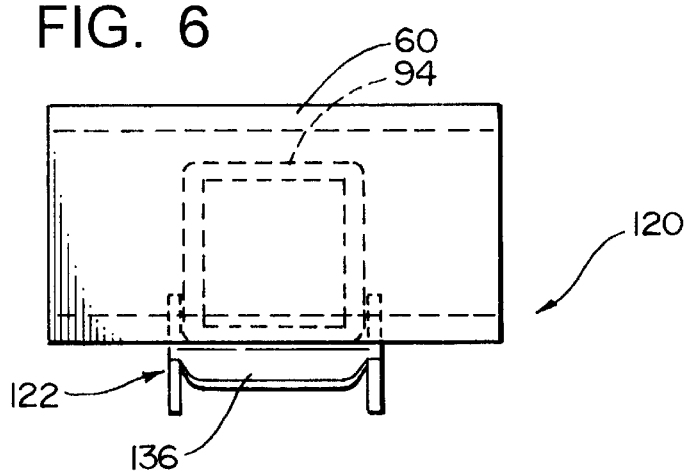
FIG. 6 is a rear elevational view depicting the arrangement of a rack member, mounting member, and lock plate of the rack system of FIG. 1.
Figure 7:
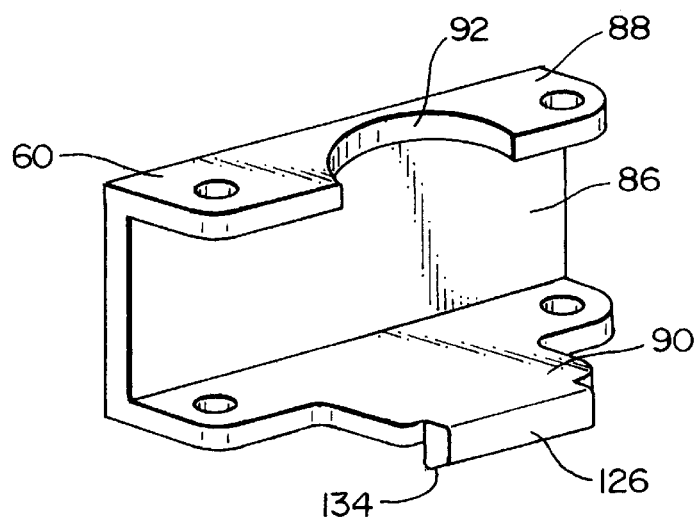
FIG. 7 is a rear perspective view of the rack member of the system of FIG. 1.

To remove the rack system 20 from its storage configuration, deliberate force is applied (such as with a foot) on the lock plate 122 in the direction and at the location generally shown by arrow A in FIG. 5. This force will compress the lock spring 128 and allow the lock projection 126 to clear the lock slot 132, at which point the rack member 60 is free to move away from the base member 46. The rack assembly 28 may then be positioned anywhere within the movement area as discussed above.

To replace the rack system 20 into its storage configuration, the rack assembly 28 is simply pushed towards the base member 46. The lock projection 126 has a cam surface 134 that, as the rack member 60 approaches the base member 46, engages a lip 136 formed on the lock plate 122. The cam surface 126 exerts a downward force on the lock plate 122 that displaces the lock plate 122 sufficiently to allow the lock projection 126 to ride over an upper surface 138 of the lock plate 122 and into the lock slot 132. The swing arms 34–40 will automatically align the rack member 60 with the lock plate 126 such that the lock projection 126 is aligned with and easily enters with the lock slot 132.

As discussed briefly above, the present invention can be constructed with only one of the two swing arm pairs 30 and 32. Such a rack system would have just as large a movement area as the movement area 100 described above and could be made just as strong and reliable. But a rack system with only one swing arm pair will not be able to self-center or self-align the locking system as described above.

Referring now for a moment back to FIG. 1, the rack assembly 28 will be described in further detail. The exemplary rack assembly 28 is particularly suited for carrying bicycles, and that application will be described herein. However, it should be clear that the attachment system 26 may be used with other types of rack assemblies. Accordingly, the type of rack assembly used will depend upon the item to be carried, and the attachment system 26 will work with any one of a number of rack assemblies.

The exemplary rack assembly 28 comprises a post member 220, a tray member 222, first and second support assemblies 224 and 226, and a lock cable 228.

The post member 220 is rigidly connected to and vertically extends from the rack member 60. The tray member 222 is rigidly connected to an upper end of the post member 220 such that the tray member is horizontal and substantially orthogonal to the mounting member 94. Both of these connections are preferably permanent connections formed by welding, but less permanent techniques can be employed.

The tray member 222 comprises a slanted front surface 230, a rear surface 232, an upper surface 234, and a connecting surface 236. The tray member 222 further defines a series of support passageways 238 formed by front holes 240 in the front surface 230 and rear holes 242 (FIG. 2) formed in the rear surface 232.

The exemplary support assemblies 224 and 226 are the same and only one will be described in detail herein. The support assembly 224 comprises a support rod 244, a plurality of clip members 246, a clip strap 248 (FIG. 2) for each clip member 246, first and second end caps 250 and 252, and a support pin 254.

The support rod 244 extends through one of the support passageways 238 and is held in place by the support pin 254. The clip members 246 are attached to the support rod 244 and are adapted to engage and support the frame of a bicycle (not shown). The clip straps 248 engage the clips 246 to hold the bicycle frame against the clips 246.

As shown in FIG. 8, the support rod 244 is hollow, and the end caps 250 and 252 seal the ends of the rods. FIGS. 9A–E show that the end cap 252 further defines a cable slot 254.

Figure 11A:
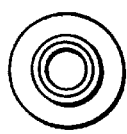
FIGS. 11a and 11b are bottom plan and side elevational views of a large diameter end member of the cable shown in FIG. 8.
Figure 12C:
FIGS. 12a–12c are first side elevational, second side elevational, and top plan views of the other end member employed by the cable of FIG. 10.
Figure 11B:
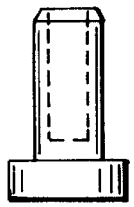
Figure 12A:
Figure 12B:
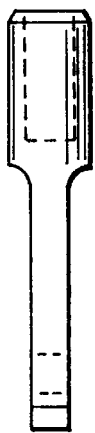

As shown in FIG. 10, the locking cable 228 comprises a wide end member 256 (FIGS. 11A–B) and a narrow end member 258 (FIGS. 12A–C). These members 256 and 258 are rigidly attached by crimping or the like to the ends of a cable 260. As shown in FIG. 1, the narrow end member 258 is passed through a cable hole 262 formed in the upper surface 234 of the tray member 222 and into the cable slot 254. The wide end member 256 cannot pass through the cable hole 262, and a padlock hole 264 is formed in the narrow end member 258. With a padlock (not shown) extending through the padlock hole 264, the locking cable 228 cannot be easily removed from the system 20, and bicycles carried by the system 20 are less likely to be stolen.

Figure 13:
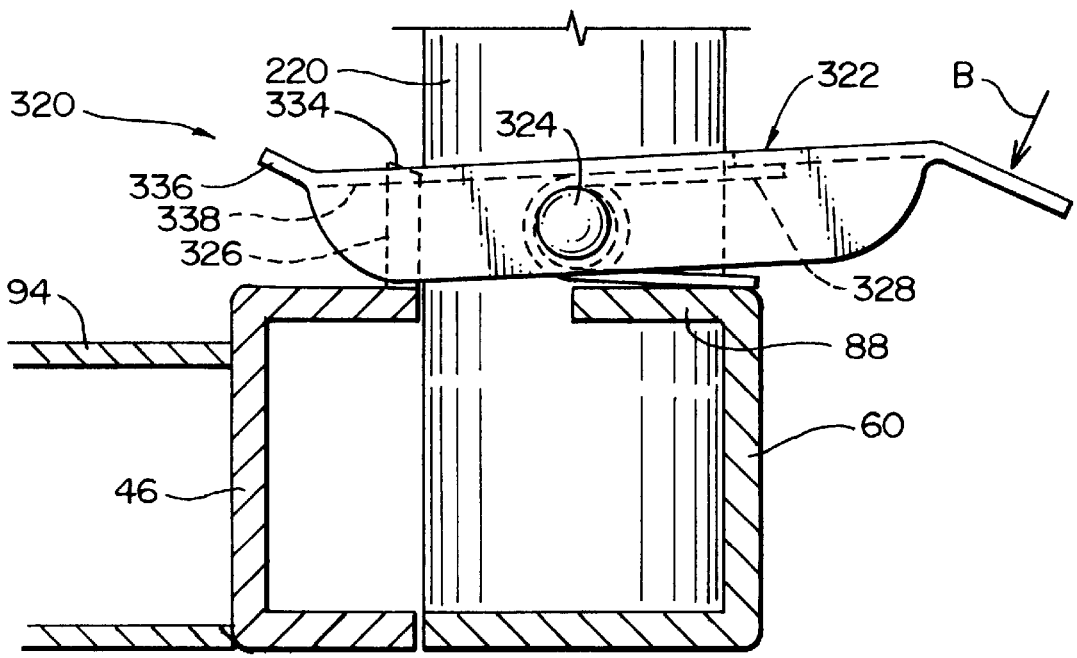
FIG. 13 is a partial cut-away view depicting a second exemplary locking assembly that may be used by the present invention.
Figure 14:
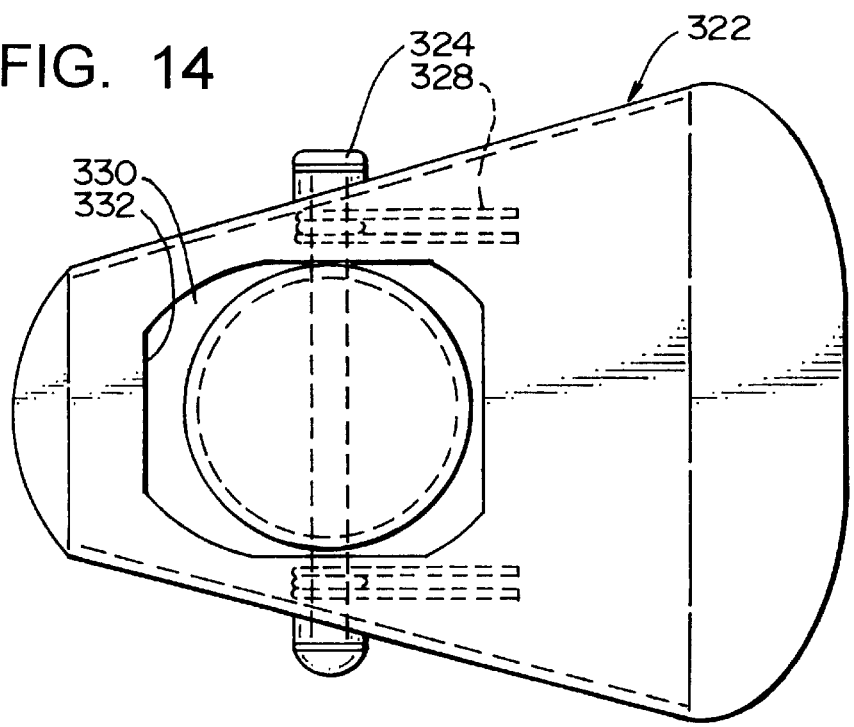
FIG. 14 is a top plan view of the locking system of FIG. 13.
Figure 20:
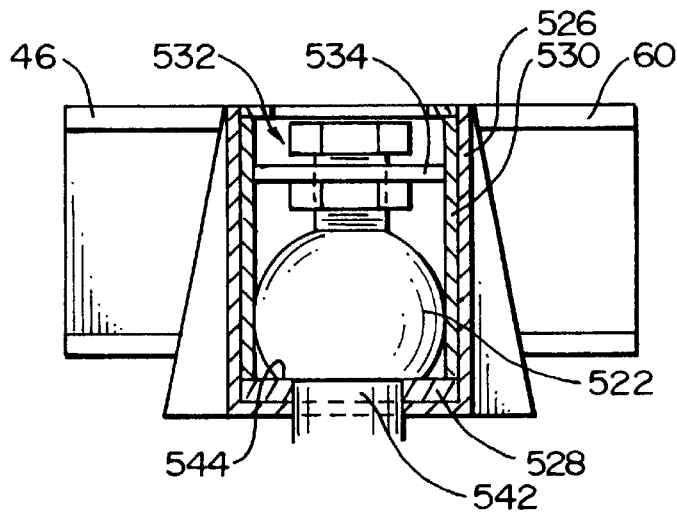
FIG. 20 is a side, elevational, cut-away view depicting how the rack system of FIG. 19 is adapted to directly engage a conventional ball hitch member.
Figure 22:
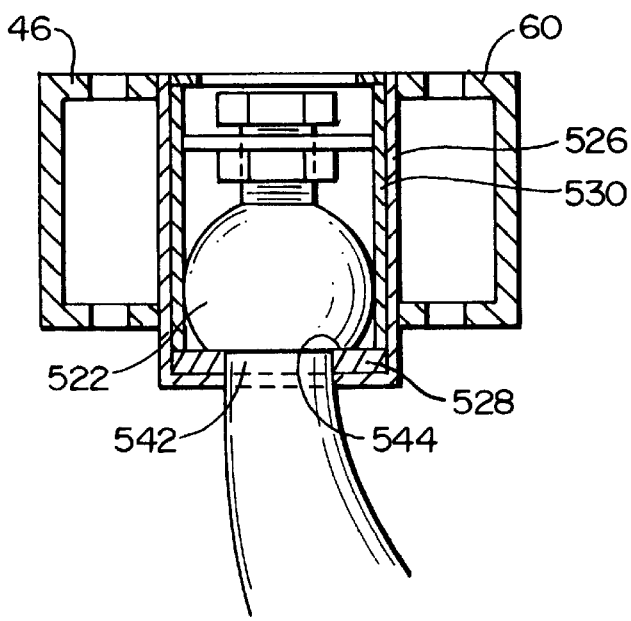
FIG. 22 is a side elevational cut-away view depicting how the rack system of FIG. 19 is attached to a ball hitch member.
Figure 21:
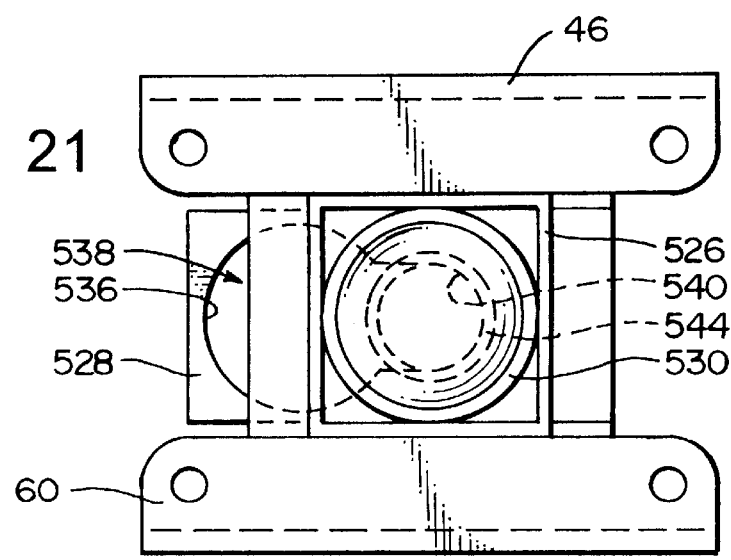
FIG. 21 is a top plan view of a portion of the rack system of FIG. 19 depicting a slide plate employed thereby.
Figure 23:
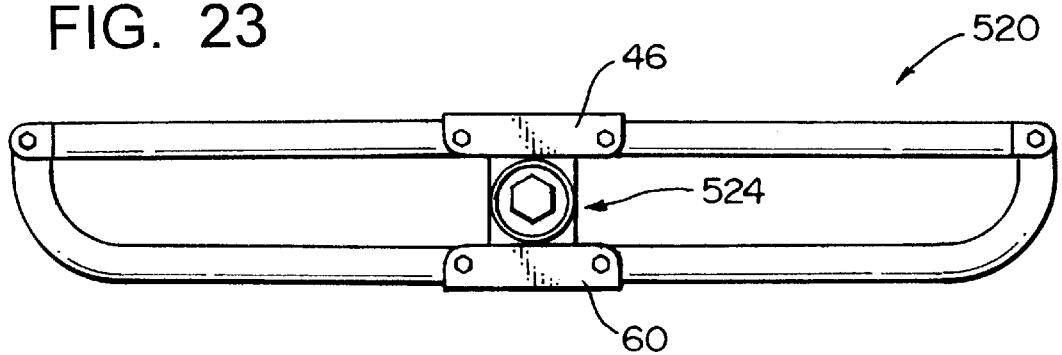
FIGS. 23–26 are top plan views depicting the range of motion allowed by the rack system depicted in FIG. 19.
Figure 24:
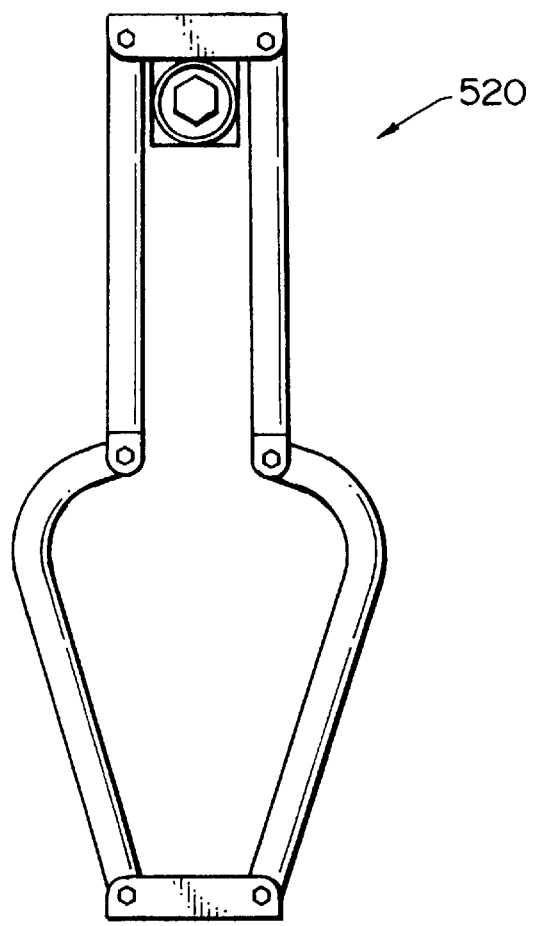
Figure 25:
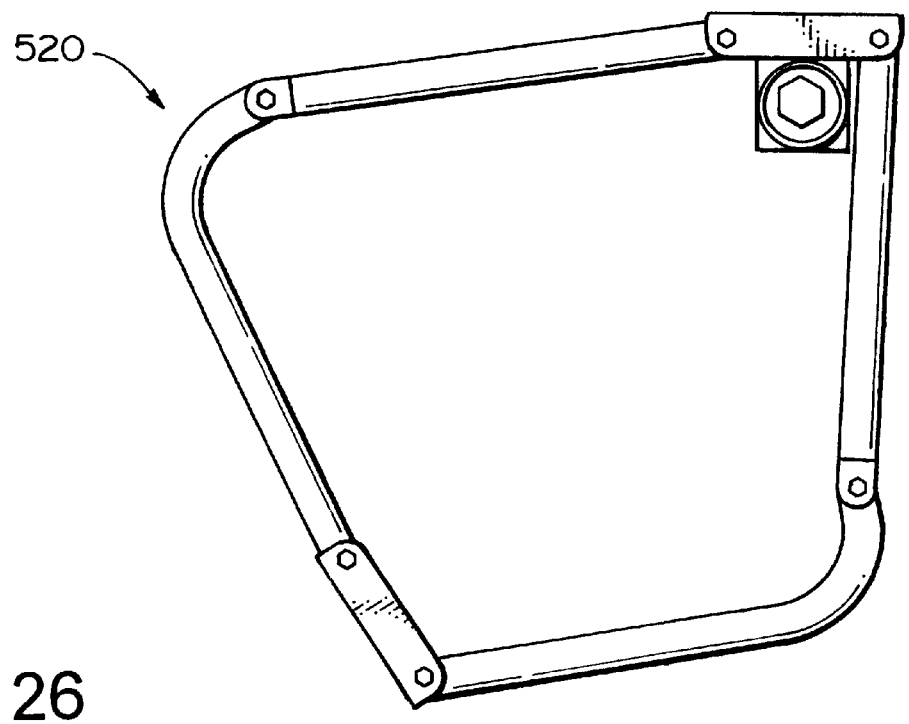
Figure 26:
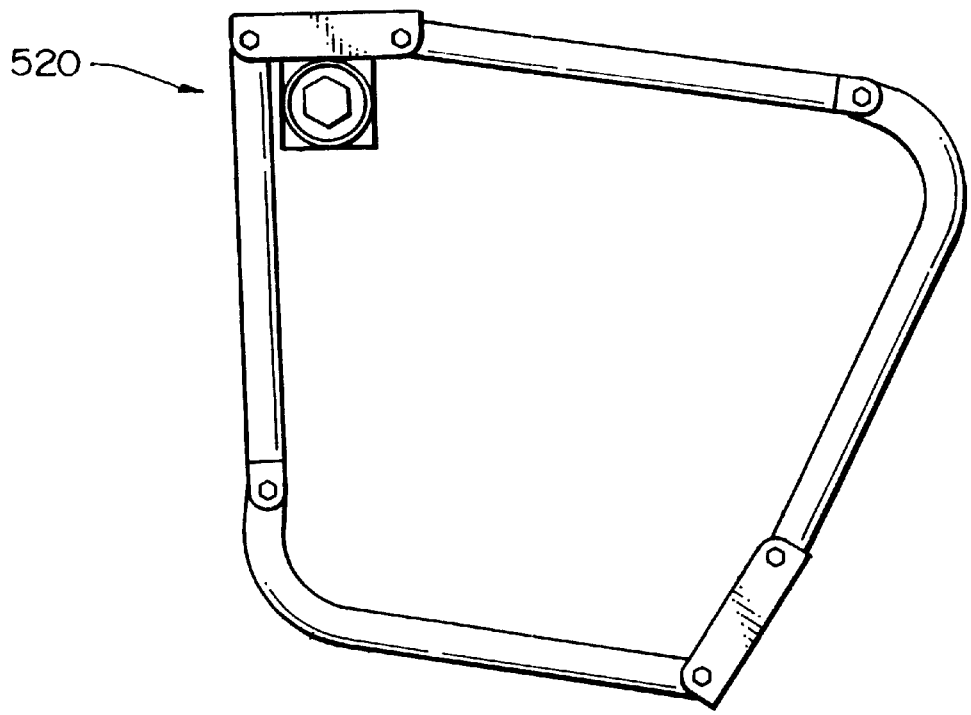

Referring now to FIGS. 13 and 14, depicted therein is a locking system 320 that may be substituted for the system 120 described above. The locking system 320 comprises a lock plate 322, a lock pin 324, a lock projection 326, and a lock spring 328.

The lock plate 322 is pivotably connected to the support pole 220 (and thus to the rack member 60) by the lock pin 324. The lock spring 328 is a torsion spring that is held in place under the lock plate 322 and above the rack member upper flange 88 such that the lock spring 328 opposes downward rotation (counterclockwise in FIG. 15) of the lock plate 322 relative to the rack member 60. The lock projection 326 is formed on and upwardly extends from the base member upper flange 90. A through hole 330 is formed in the lock plate through which the support post 220 extends, and a lock surface 330 on the lock plate 322 defines at least a portion of the through hole 330.

When the rack assembly 28 is in the storage position, the rack member 60 is located adjacent to the base member 46, and the lock spring 328 urges the lock plate 322 such that the lock projection 326 is received within the through hole 330 and engages the lock surface 332. With the lock projection 326 so received within the through hole 330, relative movement of the rack member 60 relative to the base member 46 is prevented and the rack system 20 is in its storage configuration.

To remove the rack system 20 from its storage configuration, deliberate force is applied (such as with a foot) on the lock plate 322 in the direction and at the location generally shown by arrow B in FIG. 13. This force will compress the lock spring 328 and allow the lock projection 326 to clear the lock surface 332, at which point the rack member 60 is free to move away from the base member 46. The rack assembly 28 may then be positioned anywhere within the movement area as discussed above.

To replace the rack system 20 into its storage configuration, the rack assembly 28 is simply pushed towards the base member 46. The lock projection 326 has a cam surface 334 that, as the rack member 60 approaches the base member 46, engages a lip 336 formed on the lock plate 322. The cam surface 326 exerts a force on the lock plate 322 that displaces the lock plate 322 against the force of the lock spring 328 sufficiently to allow the lock projection 326 to ride over a lower surface 338 of the lock plate 322 and into the through hole 330. As described above, the swing arms 34–40 will automatically align the rack member 60 with the lock plate 326 such that the lock projection 326 is aligned with and easily enters with the through hole 330.

Referring now to FIGS. 15–18, depicted at 420 therein is another embodiment of a rack system constructed in accordance with, and embodying, the principles of the present invention. The rack system 420 is similar to the rack system 20 described above, but differs from the system 20 in that, rather than employing a mounting member that directly engages a hitch receiver, the system 420 is adapted to be mounted to a trailer hitch assembly 422.

FIGS. 15 and 18 shows that the trailer hitch assembly 422 comprises a mounting member 424 and a hitch member 426. When the trailer hitch assembly 422 is in use, the mounting member 424 is received by the hitch receiver 22 in the same manner as the mounting member 94 described above. Accordingly, the mounting member 94 cannot be used because the mounting member 424 is occupying the hitch receiver 22.

The rack system 420 thus comprises a collar assembly 428 in place of the base member 48 and mounting member 94. The collar assembly 428 comprises a base member 430 and collar bolt tightening bolt assemblies 432 (FIG. 16). The base member 430 is a rigid member defining a rectangular through hole 434 sized and dimensioned to snugly receive a rectangular portion 436 of the mounting member 424. The base member further comprises a rear wall 438, upper and lower flanges 440 and 442, and first and second brace walls 444 and 446. The collar bolt tightening assemblies 432 extend through the lower flange 442 and act on a pressure plate 447 that engages the rectangular portion 436 of the mounting member 424.

The system 420 further comprises inner swing arms 448 and 450 that work in almost the same manner as the swing arms 34 and 38 described above. But as perhaps best shown in FIGS. 15 and 17, the swing arms 448 and 450 are canted so that the outer swing arms 36 and 40 move in a horizontal plane that is above the hitch member 426. In this respect, it should be noted that the brackets 64 and sleeves 66 must remain vertical to allow proper rotation of the various components of the system 420.

In use, the mounting member 424 of the hitch assembly 422 is first inserted through the through hole 434 in the base member 430 and then into the hitch receiver 22. The collar tightening bolt assemblies 432 are then tightened to secure the base member 430 to the mounting member 424. Assembled onto the mounting member 424 as just described, the system 420 will operate in much the same way as the system 20 described above.

The locking systems 120 and 320 described above need to be modified for use with the system 420. In particular, because the base member 430 and rack member 60 are in two different horizontal planes as shown in FIG. 17, the locking plates and projections described above will not be able to engage each other to fix the position of the rack member 60 relative to the base member 430. Accordingly, an extension member such as the extension member shown at 448 in FIG. 17 may be required to allow the locking projection and locking plate to engage each other as described above.

Referring now to FIG. 19, depicted at 520 therein is yet another attachment system that may be used in place of the system 26 described above. The attachment system 520 operates in the same basic manner as the system 26 described above but is adapted to be mounted directly onto a trailer hitch member 522 of a trailer hitch assembly (not shown). Instead of the mounting member 94 described above, the base member 46 is attached to a gripping assembly 524 adapted to be rigidly attached to the hitch member 522.

In particular, the gripping assembly 524 comprises a housing member 526, a slide plate 528, an inner enclosure 530, and a clamp bolt assembly 532. The slide plate 528 is mounted at the bottom of the housing member 526 such that the plate 528 can slide between a loading position and a locking position. The inner enclosure 530 is cylinder that is rigidly mounted within the housing member 526. The clamp bolt assembly 532 is mounted on a fixed plate 534 rigidly mounted within the inner enclosure 530.

The slide plate 528 defines a slide hole 536 having a large diameter portion 538 and a small diameter portion 540. When the slide plate 528 is in the loading position, the large diameter portion 538 of the slide hole 536 is arranged under the inner enclosure 530. When the slide plate 528 is in the locking position, the small diameter portion 540 of the slide hole 536 is arranged under the inner enclosure 530.

In use, the slide plate 528 is arranged in the loading position and the housing assembly 524 displaced such that the hitch member 522 enters the inner enclosure through the large diameter portion 538 of the slide hole 536. The slide plate 528 is then slid into the locking position such that the small diameter portion 540 of the slide hole 536 surrounds a reduced diameter throat portion 542 of the hitch member 522. At this point, the hitch member 522 is restrained from moving in any direction to the side or down relative to the base member 46.

To prevent the hitch member 522 from moving up relative to the base member 46, the clamp bolt assembly 532 is operated to engage the hitch member 522 and force the hitch member 522 against a perimeter portion 544 of the slide plate 528 defining the small diameter portion 540 of the slide hole 528. When the clamp bolt assembly 532 is fully tightened, the hitch member 522 is held securely within the housing assembly 524 such that relative movement between the hitch member 522 and the base member 48 is prevented.

FIGS. 23–26 illustrate the range of movement that the attachment system 520 allows. Because of the box assembly 524, the range of movement allowed by the system 520 is somewhat less than the movement area allowed by the attachment system 26 but still sufficient for most vehicle rear doors.

As with the rack system 420 described above, the locking assembly of the system 520 must be altered somewhat from the locking assemblies 120 and 320 described above because the rack member 60 of the system 420 does not directly engage the mounting member 48 thereof. The basic principles of these locking systems 120 and 320 are, nonetheless, applicable to the system 520.

From the foregoing, it should be clear that the present invention may be embodied in forms other than those described above.

I claim:

1. A rack system for carrying items on a vehicle having a trailer hitch receiver comprising:
   a base member;
   rigid connecting means for rigidly connecting the base member to the trailer hitch receiver;
   a rack member;
   a first swing arm assembly comprising
      an inner swing arm having first and second ends,
      an outer swing arm having first and second ends,
      a first pivot assembly that pivotably connects the first end of the inner swing arm to the base member,
      a second pivot assembly that pivotably connects the first end of the outer swing arm to the second end of the inner swing arm such that the outer swing arm moves in substantially the same plane as the inner swing arm, and
      a third pivot assembly that pivotably connects the second end of the outer swing arm to the rack member;
      a sixth pivot assembly that pivotably connects the second end of the outer swing arm to the rack member; wherein
      the second and fifth pivot assemblies are arranged such that the inner and outer swing arms of the first and second swing arm assemblies move in substantially the same plane;
   rack means rigidly attached to the rack member; and
   locking means for placing the rack system in a storage configuration by selectively locking the rack member to the base member to prevent relative movement therebetween; wherein
   when the rack system is not in the storage configuration, the rack member and rack assembly attached thereto may be moved relative to the base member to either side of the vehicle within a horizontal movement area defined at least in part by the inner and outer swing arms has been inserted.

2. A rack system as recited in claim 1, in which the rigid connecting means comprises a mounting member adapted to securely engage the trailer hitch receiver, where the mounting member is welded to the base member.

3. A rack system as recited in claim 1, in which the rigid connecting means comprises:
   a mounting member adapted to be rigidly connected to the trailer hitch receiver; and
   a collar assembly comprising
      a base member that partially surrounds the mounting member, and
      a bolt assembly that acts on the base member and the mounting member to secure the base member relative to the mounting member.

4. A rack system as recited in claim 1, in which the rigid connecting means comprises:
   a ball hitch member of a trailer hitch assembly; and
   a gripping assembly comprising
      a housing member that partially surrounds the ball hitch member,
      an inner enclosure mounted within the housing member that also partially surrounds ball hitch member,
      a slide plate defining a slide hole movable mounted within the housing member below the inner enclosure such that the slide plate can move between a loading position and a locking position, and
      a bolt assembly attached to the housing member above the inner enclosure; wherein
   a portion of the ball hitch member extends through the slide hole into the inner enclosure and engages the inner enclosure and the slide plate such that the ball hitch member is prevented from being withdrawn from the inner enclosure and moving in any side direction relative to the housing member; and
   the bolt assembly acts downwardly the ball hitch member to force the ball hitch member against the slide plate and thereby inhibit relative movement between the housing member and the ball hitch member.

5. A rack system as recited in claim 1, in which the rack assembly comprises:
   a post member rigidly connected to the rack member;
   a tray member rigidly connected to the post member, where the tray member comprises a plurality of holes formed therein defining at least one support passageway;
   at least one support rod that extends through the at least one support passageway such that the support rod engages and is supported by the tray member; and
   means for preventing the at least one support rod from being withdrawn from the at least one support passageway.

6. A rack system as recited in claim 1, in which the locking means comprises:
   a locking plate pivotably fixed relative to one of the base member and the rack member;
   spring means for urging the locking plate into a locked position;
   engagement means formed on the other of the base member and the rack member for engaging the locking plate when the locking plate is in the locked position to prevent relative member between the base member and the rack member; wherein
   the plate means may be moved out of the locked position against the urging of the spring means to allow the rack system to be taken out of the storage configuration.

7. A rack system as recited in claim 1, in which the second pivot assembly comprises:
   a bracket rigidly connected to the inner swing arm;
   a sleeve formed on the outer swing arm; and
   a bolt assembly; wherein
   the bracket receives at least a portion of the sleeve and the bolt assembly extends through at least a portion of the bracket and the sleeve to allow rotational movement of the inner and outer swing arms relative to each other.

8. A rack system as recited in claim 7, in which the bracket comprises upper and lower projections, where the sleeve is sized and dimensioned to be received between the upper and lower projections of the bracket.

9. A rack system as recited in claim 8, in which openings are formed in the upper and lower projections and the sleeve and the bolt assembly comprises a bolt that extends through the openings in the upper and lower projections and the sleeve.

10. A rack system as recited in claim 1, in which the first and second pivot assemblies each comprise:
    a bracket rigidly connected to one of the inner and outer swing arms;
    a sleeve formed on the other of the inner and outer swing arms; and
    a bolt assembly; wherein
    the bracket receives at least a portion of the sleeve and the bolt assembly extends through at least a portion of the bracket and the sleeve to allow rotational movement of the inner and outer swing arms relative to each other.

11. A method of carrying items on a vehicle having a trailer hitch receiver comprising the steps of:
    providing a base member;
    rigidly connecting the base member to the trailer hitch receiver;
    providing a swing arm pair comprising
        an inner swing arm having a first end and a second end, and
        an outer swing arm having a first end and a second end;
    providing a rack member;
    providing a rack assembly;
    pivotably connecting the first end of the inner swing arm to the base member;
    pivotably connecting the first end of the outer swing arm to the second end of the inner swing arm such that the inner and outer swing arms move relative to each other in substantially the same plane;
    pivotably connecting the second end of the outer swing arm to the rack member;
    providing a second swing arm pair comprising
        an inner swing arm having a first end and a second end, and
        an outer swing arm having a first end and a second end; and
        arranging the first and second swing arm pairs on opposite sides of the base member;
        pivotably connecting the first end of the inner swing arm of the second swing arm pair to the base member;
        pivotably connecting the first end of the outer swing arm of the second swing arm pair to the second end of the inner swing arm of the second swing arm pair, such that the inner and outer swing arms move relative to each other in substantially the same plane; and
        pivotably connecting the second end of the outer swing arm of the second swing arm pair to the rack member;
    rigidly attaching the rack assembly to the rack member;
    placing the rack system in a storage configuration by selectively locking the rack member to the base member to prevent relative movement therebetween; and
    when the rack system is not in the storage configuration, moving the rack member and rack assembly attached thereto relative to the base member to either side of the vehicle within a horizontal movement area defined at least in part by the inner and outer swing arms of said swing arm assemblies.

12. A method as recited in claim 11, in which the step of rigidly connecting the base member to the trailer hitch receiver comprises the step of welding the base member to a mounting member adapted to be rigidly connected to the trailer hitch receiver.

13. A method as recited in claim 11, in which the step of rigidly connecting the base member to the trailer hitch receiver comprises the steps of:
    providing a trailer hitch assembly comprising a mounting member;
    forming a collar assembly comprising the base member and a bolt assembly; and
    placing the base member around a portion of the mounting member of the trailer hitch assembly; and
    tightening the bolt assembly to fix the base member relative to the mounting member.

14. A method as recited in claim 11, in which the step of rigidly connecting the base member to the trailer hitch receiver comprises the steps of:
    providing a ball hitch member; and
    providing a gripping assembly comprising
        a housing member,
        an inner enclosure;
        a slide plate defining a slide hole, and
        a bolt assembly;
    mounting the inner enclosure within the housing member;
    movably mounting the slide plate within the housing member below the inner enclosure such that the slide plate can move between a loading position and a locking position;
    attaching the bolt assembly to the housing member above the inner enclosure;
    moving the slide plate into the loading position in which the ball hitch member can pass through the slide hole;
    moving the slide plate into the locking position in which the ball hitch member is prevented from passing through the slide hole;
    operating the bolt assembly to force the ball hitch member against the slide plate and thereby inhibit relative movement between the housing member and the ball hitch member.

15. A method as recited in claim 11, in which the step of pivotably connecting the first end of the outer swing arm to the second end of the inner swing arm comprises the steps of:
    rigidly connecting a bracket to one of the inner and outer swing arms;
    forming a sleeve on the other of the inner and outer swing arms;
    arranging the sleeve within the bracket; and
    inserting a portion of a bolt assembly through at least a portion of the bracket and the sleeve to allow rotational movement of the inner and outer swing arms relative to each other.

16. A method as recited in claim 15, further comprising the steps of:
    forming upper and lower projections on the bracket; and
    arranging the sleeve between the upper and lower projections of the bracket.

17. A method as recited in claim 16, further comprising the steps of:
    forming openings in the upper and lower projections and the sleeve; and passing a bolt through the openings in the upper and lower projections and the sleeve to form the bolt assembly.

18. A method as recited in claim 11, in which the steps of pivotably connecting the first ends of the outer swing arms to the second ends of the inner swing arms comprise the steps of:

rigidly connecting a bracket to one of the inner and outer swing arms;

forming a sleeve on the other of the inner and outer swing arms;

arranging the sleeve within the bracket; and inserting a portion of a bolt assembly through at least a portion of the bracket and the sleeve to allow rotational movement of the inner and outer swing arms relative to each other.

19. A rack system for carrying items on a vehicle having a trailer hitch receiver comprising:

a base member;

rigid connecting means for rigidly connecting the base member to the trailer hitch receiver;

a rack member;

first and second swing arm pairs each comprising
an inner swing arm having a first end pivotably connected to the base member,
an outer swing arm having a first end pivotably connected to a second end of the inner swing arm and a second end pivotably connected to the rack member, rack means rigidly attached to the rack member; and locking means for placing the rack system in a storage configuration by selectively locking the rack member to the base member to prevent relative movement therebetween; wherein pivot assemblies connect the outer swing arms to the inner swing arms such that the first and second swing arm assemblies are arranged on opposite sides of the base member, and the outer swing arms move in substantially the same plane as the inner swing arms; and when the rack system is not in the storage configuration, the rack member and rack assembly attached thereto may be moved relative to the base member to either side of the vehicle within a horizontal movement area defined at least in part by the inner and outer swing arms.

20. A method of carrying items on a vehicle having a trailer hitch receiver comprising the steps of:

providing a base member;

rigidly connecting the base member to the trailer hitch receiver;

providing first and second swing arm pairs each comprising
an inner swing arm having a first end and a second end, and
an outer swing arm having a first end and a second end;

providing a rack member;

providing a rack assembly;

pivotably connecting the first ends of the inner swing arms to the base member;

pivotably connecting the first ends of the outer swing arms to the second ends of the inner swing arms such that
the first and second swing arm pairs are arranged on opposite sides of the base member, and
the inner and outer swing arms move relative to each other in substantially the same plane;

pivotably connecting the second ends of the outer swing arms to the rack member;

rigidly attaching the rack assembly to the rack member;

placing the rack system in a storage configuration by selectively locking the rack member to the base member to prevent relative movement therebetween; and when the rack system is not in the storage configuration, moving the rack member and rack assembly attached thereto relative to the base member to either side of the vehicle within a horizontal movement area defined at least in part by the inner and outer swing arms.

* * * * *